(12) United States Patent
Rodriguez

(10) Patent No.: US 11,450,229 B2
(45) Date of Patent: Sep. 20, 2022

(54) EXPLORATORY LEARNING DEVICE

(71) Applicant: Stanton Rodriguez, Salt Lake, UT (US)

(72) Inventor: Stanton Rodriguez, Salt Lake, UT (US)

( * ) Notice: Subject to any disclaimer, the term of this patent is extended or adjusted under 35 U.S.C. 154(b) by 604 days.

(21) Appl. No.: 16/545,199

(22) Filed: Aug. 20, 2019

(65) Prior Publication Data
US 2021/0052944 A1    Feb. 25, 2021

(51) Int. Cl.
| | | |
|---|---|---|
| *G09B 19/00* | (2006.01) | |
| *A63B 21/00* | (2006.01) | |
| *A63B 21/28* | (2006.01) | |
| *A63B 22/00* | (2006.01) | |
| *A63B 69/00* | (2006.01) | |

(52) U.S. Cl.
CPC ........... *G09B 19/003* (2013.01); *G09B 19/00* (2013.01); *A63B 21/28* (2013.01); *A63B 21/4007* (2015.10); *A63B 69/00* (2013.01); *A63B 2022/0092* (2013.01); *A63B 2225/09* (2013.01)

(58) Field of Classification Search
CPC ... A63B 21/28; A63B 21/285; A63B 21/4007; A63B 69/0028; A63B 69/0059; A63B 22/00; A63B 2244/22; G09B 19/00; G09B 19/003; A61H 3/00
See application file for complete search history.

(56) References Cited

U.S. PATENT DOCUMENTS

| | | | | | |
|---|---|---|---|---|---|
| 4,214,382 | A | * | 7/1980 | Matsutani | A63B 71/0009 273/DIG. 27 |
| 5,002,273 | A | * | 3/1991 | Sela | A63B 69/0071 473/450 |
| 5,150,901 | A | * | 9/1992 | Stawicki | A63B 69/3632 473/215 |

(Continued)

OTHER PUBLICATIONS

"Wallendas Tight Rope Human Pyramid", Image, Feb. 22, 2018, WTOP News, "Big Apple Circus coming to National Harbor, thanks to retired Md. surgeon", https://wtop.com/business-finance/2018/02/big-apple-circus-comes-to-national-harbor/ (Year: 2018).*

*Primary Examiner* — Robert J Utama
*Assistant Examiner* — Correll T French
(74) *Attorney, Agent, or Firm* — Kimberly McLean, Esq; McLean Law LLC

(57) ABSTRACT

An exploratory learning device including a pair of body frame members worn by a first user and a second user respectively. Each body frame member has a shape for receiving a corresponding user's upper torso and each body frame member includes a center aperture. The pair of body frame members are attachably connected to one another by an adjustable beam which is positioned between the pair of body frame members thereby creating an interdependency of movement between the first and second users and thereby causing a distance of separation between the first and the second users. The adjustable beam has a ball and socket attached at both ends of the beam. Each ball and socket connects to the center aperture of a corresponding body frame member which allows the corresponding user to move in different positions to explore dynamics of physical connectivity and physical forces between the first user and the second user.

7 Claims, 1 Drawing Sheet

(56) References Cited

U.S. PATENT DOCUMENTS

| | | | |
|---|---|---|---|
| 8,662,899 B1* | 3/2014 | Alayoub | A63B 67/00 434/236 |
| 2002/0010056 A1* | 1/2002 | Borsheim | A61H 3/00 482/54 |
| 2003/0220160 A1* | 11/2003 | Clark | A63B 69/0057 473/446 |
| 2007/0049468 A1* | 3/2007 | Stebler | A63B 26/00 280/600 |
| 2016/0089591 A1* | 3/2016 | Williamson | A63B 69/0093 434/253 |

* cited by examiner

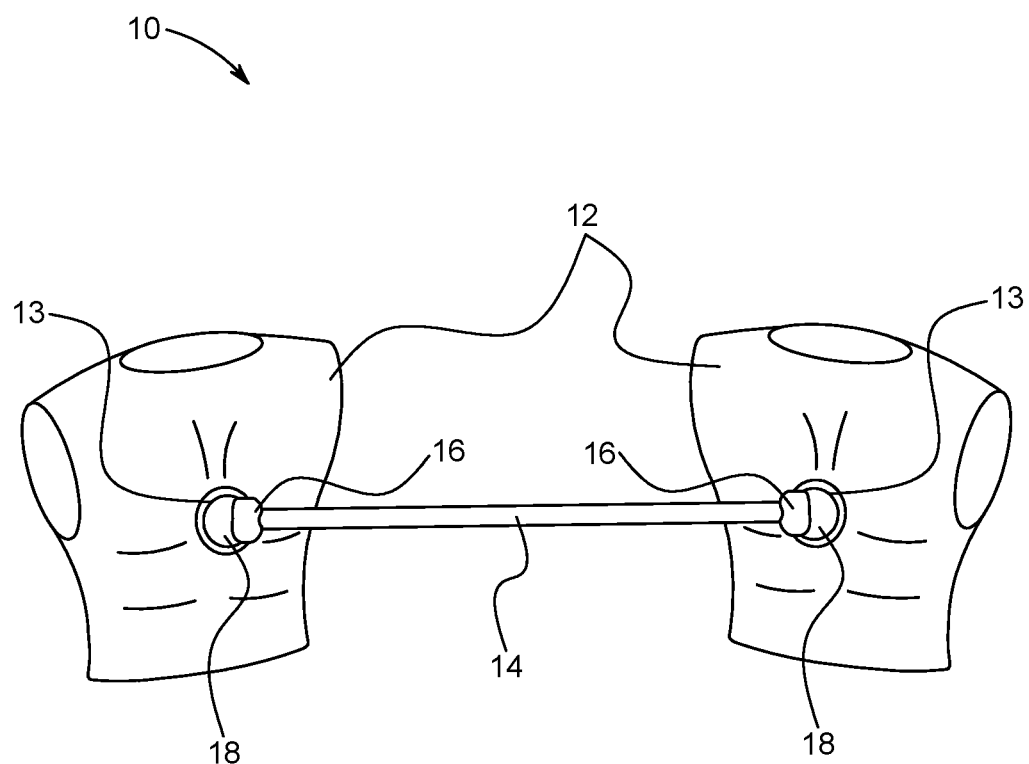

EXPLORATORY LEARNING DEVICE

FIELD OF THE INVENTION

Embodiments described herein generally relate to learning devices, and more particularly to an exploratory learning device.

BACKGROUND OF THE INVENTION

Many traditional learning devices and practices involve asking questions that attempt to illicit a single correct answer. This model disregards the value of doing in terms of the learning process. On the contrary, explicit learning models provide materials that allow a user to create situations so that the user may find answers to their questions on their own through experience. Hence, it is desirable to provide an improved way of learning using exploratory and explicit learning models.

BRIEF DESCRIPTION OF THE DRAWINGS

The various advantages of the embodiments of the present disclosure will become apparent to one skilled in the art by reading the following specification and appended claims, and by referencing the following drawing(s), in which:

FIG. 1 shows an exemplary view of an exploratory learning device according to an embodiment of the present disclosure.

SUMMARY OF THE INVENTION

Exemplary embodiments disclosed herein describe an exploratory learning device including a pair of body frame members worn by a first user and a second user respectively. Each body frame member has a shape for receiving a corresponding user's upper torso and each body frame member includes a center aperture. The pair of body frame members are attachably connected to one another by an adjustable beam which is positioned between the pair of body frame members thereby creating an interdependency of movement between the first and second users. The adjustable beam has a ball and socket attached at both ends of the beam. Each ball and socket connects to the center aperture of a corresponding body frame member which allows the corresponding user to move to different positions relative to the other user to explore dynamics of physical connectivity between the first user and the second user and effects of motion on the dynamics of their physical connectivity.

In some exemplary embodiments, each ball has a range of motion within the socket which allows each user to move at different angles relative to one another.

In some exemplary embodiments, the adjustable beam positioned between the pair of body frame members creates a distance of separation between the first and the second users.

In some exemplary embodiments, the distance of separation between the first user and the second user is equal to the length of the adjustable beam.

In some exemplary embodiments, the length of the adjustable beam is adjustable.

In some exemplary embodiments, the dynamics of physical connectivity between the first user and the second user include one or more from the group comprising balance, leverage, stability, strength and coordinated action between the first and second users as partners.

In some exemplary embodiments, each body frame member includes internal supportive padding.

DETAILED DESCRIPTION

The present disclosure relates to an exploratory learning device ("the device"). The device offers users the experiences necessary to explore leverage, balance and adaptive strategies for addressing unexpected bodily positions with strength and stability. The device also facilitates coordinative action between participants as partners and can therefore provide abstract information with respect to social interaction and social strategy. The device can be useful in team building settings, sports teams settings, psychology-based fields, research-based fields and in general health and well-being facilities.

As shown in FIG. 1, an exemplary illustration of device 10 may include a pair of body frame members 12 which are worn by a first user and a second user respectively. Each body frame member is shaped to receive a user's upper torso. Each body frame member may include a center aperture 13 and internal supportive padding. The body frame members may be made out of any suitable material.

The pair of body frame members 12 are attachably connected to one another by an adjustable beam 14 which is positioned between the pair of body frame members creating an interdependency of movement between the first user and the second user. Essentially, each user's motion may be affected by the other user's motion. While the first user and the second user are bound together by the adjustable beam which is attached to each body frame member worn by the first user and the second user respectively, each user has freedom of movement but the degree of freedom is restricted by the attachment to the other user.

Moreover, there is a separation of distance between the first user and the second user created by the adjustable beam 14 which is attached between the pair of body frame members 12. The distance between the first and second users also affects the movement of the first and second users. The distance of separation between the first user and the second user is equal to the length of the adjustable beam. The adjustable beam has an adjustable length, and therefore, the distance of separation between the first user and the second user is also adjustable.

The adjustable beam 14 may be made out of any suitable material, such as, plastic or aluminum. The adjustable beam 14 may include a ball 16 and a socket 18 at each end of the beam. Each ball may be attached to a corresponding socket, and each ball-socket connection may be connected to the aperture 13 in a corresponding body frame member 12. Each ball has a range of motion within the attached socket which provides each user with a range of motion at different angles relative to one another.

Each user may move to different positions and angles relative to the other user to explore the dynamics of the physical connectivity between them and the effect motion has on the dynamics of their physical connectivity. The dynamics of the physical connectivity between the first and second users may include balance, leverage, stability, strength and coordinated action between the first and second users as partners. The exploration process may allow each user to learn and/or master various principles related to balance, leverage, stability, strength and teamwork.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An exploratory learning device comprising:
a pair of body frame members worn by a first user and a second user respectively, each body frame member having a shape for receiving a corresponding user's upper torso and each body frame member including a center aperture, the pair of body frame members are attachably connected to one another by an adjustable beam which is positioned between the pair of body frame members thereby creating an interdependency of movement between the first and second users, the adjustable beam having a ball and socket attached at both ends of the beam, wherein each ball and socket connects to the center aperture of a corresponding body frame member which allows each corresponding user to move to different positions relative to the other user to explore dynamics of physical connectivity between the first user and the second user and effects of motion on the dynamics of their physical connectivity.

2. The device of claim 1, wherein each ball has a range of motion within the socket which allows each user to move to different angles relative to one another.

3. The device of claim 1, wherein the adjustable beam positioned between the pair of body frame members creates a distance of separation between the first and the second users.

4. The device of claim 3, wherein the distance of separation between the first user and the second user is equal to the length of the adjustable beam.

5. The device of claim 4, wherein the length of the adjustable beam is adjustable.

6. The device of claim 1, wherein the dynamics of physical connectivity between the first user and the second user include one or more from the group comprising balance, leverage, stability, strength and coordinated action between the users as partners.

7. The device of claim 1, wherein each body frame member includes internal supportive padding.

* * * * *